(12) United States Patent
Okada et al.

(10) Patent No.: US 11,334,838 B2
(45) Date of Patent: May 17, 2022

(54) BUSINESS MODEL GENERATION SUPPORT METHOD AND BUSINESS MODEL GENERATION SUPPORT DEVICE

(71) Applicant: HITACHI, LTD., Tokyo (JP)

(72) Inventors: Yuri Okada, Tokyo (JP); Yusuke Jin, Tokyo (JP); Nishio Yamada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/051,192

(22) PCT Filed: Apr. 25, 2019

(86) PCT No.: PCT/JP2019/017634
§ 371 (c)(1),
(2) Date: Oct. 28, 2020

(87) PCT Pub. No.: WO2019/225287
PCT Pub. Date: Nov. 28, 2019

(65) Prior Publication Data
US 2021/0241189 A1 Aug. 5, 2021

(30) Foreign Application Priority Data

May 25, 2018 (JP) .............................. JP2018-100641

(51) Int. Cl.
*G06Q 10/06* (2012.01)
(52) U.S. Cl.
CPC ....... *G06Q 10/067* (2013.01); *G06Q 10/0633* (2013.01)
(58) Field of Classification Search
CPC .................. G06Q 10/067; G06Q 10/0633
See application file for complete search history.

(56) References Cited

U.S. PATENT DOCUMENTS

2005/0055257 A1* 3/2005 Senturk .............. G06Q 30/0201
705/7.11
2007/0266051 A1* 11/2007 Moore ................. G06Q 10/067
(Continued)

FOREIGN PATENT DOCUMENTS

| JP | 2002-007655 A | 1/2002 |
| JP | 2007-188144 A | 7/2007 |
| JP | 2008-276653 A | 11/2008 |

OTHER PUBLICATIONS

International Search Report, PCT/JP2019/017634, dated Aug. 6, 2019, 1 pg.

*Primary Examiner* — Philip J Chea
*Assistant Examiner* — Hassan A Khan
(74) *Attorney, Agent, or Firm* — Volpe Koenig

(57) ABSTRACT

Disclosed is a business model generation support method for proposing a new business model. A computer receives a first business model and a second business model, and adds, for the plurality of business models, a first activity and a second activity which are respectively performed by the first and second business models to first information that predefines jobs performed by the business models as activities. Next, the computer adds the relation between a first data item and the first activity and the relation between a second data item and the second activity to second information that predefines the relation between the activities and the data items used for performing the activities. The first and second data items are used for performing the first and second activities, respectively. Then, the computer searches the second information to obtain a third activity including both the first data item and the second data item.

10 Claims, 16 Drawing Sheets

(56) References Cited

U.S. PATENT DOCUMENTS

| | | | | |
|---|---|---|---|---|
| 2010/0125473 A1* | 5/2010 | Tung | ............ | H04L 67/1002 |
| | | | | 709/200 |
| 2016/0063422 A1* | 3/2016 | Chen | ............ | G06Q 10/067 |
| | | | | 705/7.26 |
| 2016/0226955 A1* | 8/2016 | Moorthi | ............ | G06F 9/5061 |
| 2017/0193409 A1* | 7/2017 | Stevens | ............ | G06F 16/951 |
| 2020/0082342 A1* | 3/2020 | Passova | ............ | G06Q 10/10 |
| 2020/0160239 A1* | 5/2020 | Hull | ............ | G06Q 10/067 |

* cited by examiner

FIG. 10

T302 ACTIVITY/DATA TABLE

| | Accumulated Activities and Data Items Used by Accumulated Activities | | | | Activities of Businesses A and B and Data Items Used by Activities | | | | |
|---|---|---|---|---|---|---|---|---|---|
| ACTIVITY ID | *Act-010* | Act-011 | ... | Act-022 | ... | Act-A01 | Act-A02 | Act-A03 | ... | Act-B11 | ... |
| ACTIVITY NAME | CONSTRUCTION-MACHINERY-MOUNTED SYSTEM MAINTENANCE INFORMATION MANAGEMENT | POPULARITY RANKING OF CONSTRUCTION MACHINERY | | INSPECTION METHOD OPERATION | | INTERVIEW WITH OWNER | CONSTRUCTION MACHINERY MAINTENANCE | CONSTRUCTION MACHINERY STORAGE | | MANAGEMENT SYSTEM OPERATION | |
| DATA ITEMS | | | | | | | | | | | |
| CONSTRUCTION MACHINERY ID | O | O | | | | O | O | O | | | |
| OWNER INFORMATION | O | | | | | O | | O | | | |
| MANAGEMENT SYSTEM STATUS | O | | | | | | | | | O | |
| INSPECTION STATUS | | O | | | | | O | O | | | |
| CONSTRUCTION MACHINERY POPULARITY | | O | | | | | | | | | |
| PERFORMANCE | | O | | | | | | | | | |
| FUEL ECONOMY | | | | O | | | | | | | |
| INSPECTOR | | | | O | | | O | O | | | |
| INSPECTOR EVALUATION VALUE | | | | O | | | | | | | |
| SYSTEM MAINTAINING METHOD | | | | | | | | | | O | |
| ... | | | | | | | | | | | |

1103 — ACTIVITY ID / ACTIVITY NAME rows
1104 — Accumulated activities columns (1101)
1105 — Data items rows
1102 — Activities of Businesses A and B BUSINESS A: Act-A01, Act-A02, Act-A03
BUSINESS B: Act-B11

FIG.11

T303 DATA/COST TABLE

| DATA ID | DATA ITEM NAME | COST VALUE |
|---|---|---|
| 101 | CONSTRUCTION MACHINERY ID | 5 |
| 102 | MANAGEMENT SYSTEM STATUS | 30 |
| 103 | INSPECTION INFORMATION | 50 |
| 104 | INSPECTOR | 30 |
| 105 | INSPECTOR EVALUATION VALUE | 30 |
| 106 | MAINTAINING METHOD | 30 |
| ⋮ | ⋮ | ⋮ |

1201  1202  1203

FIG. 12
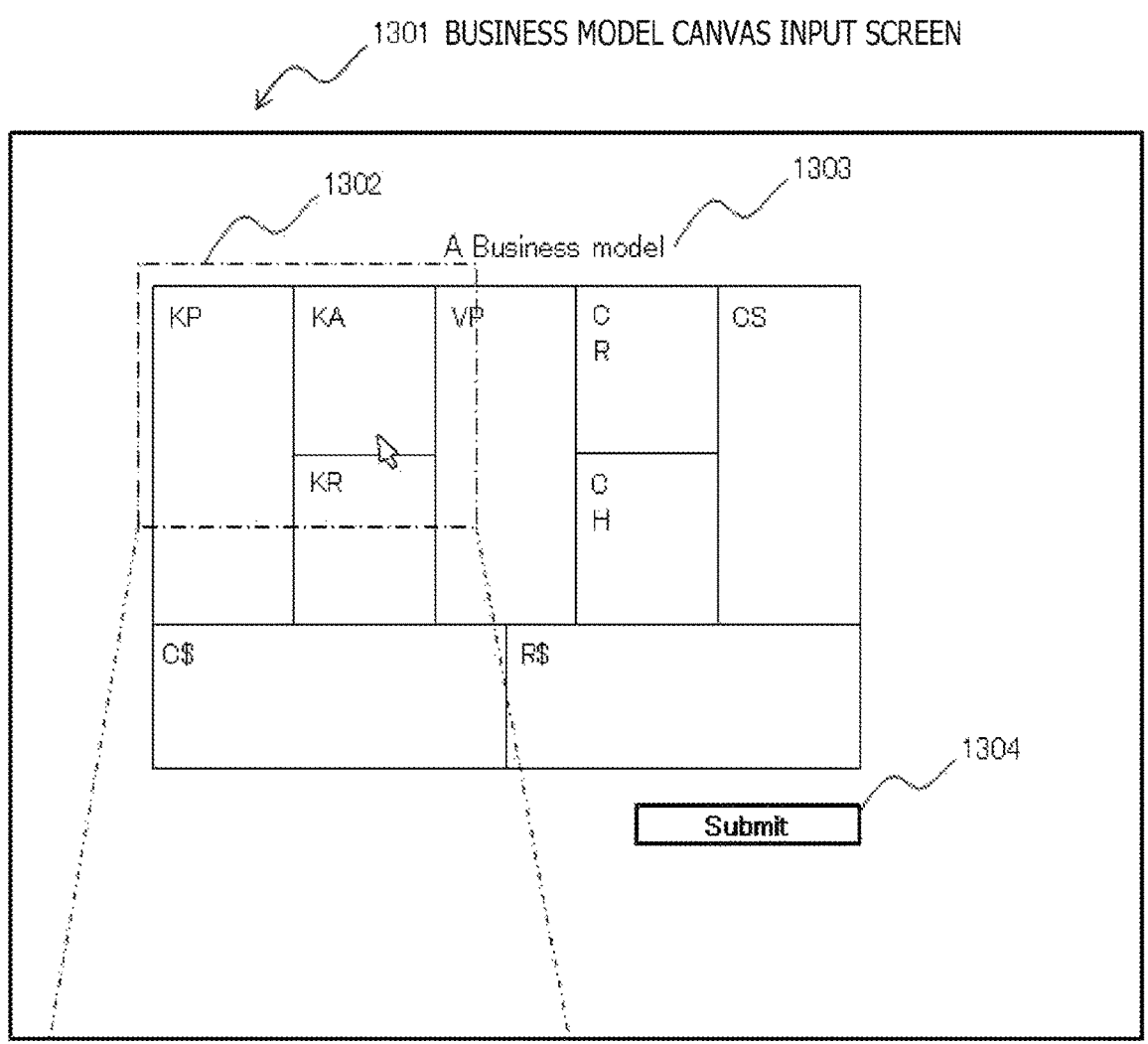
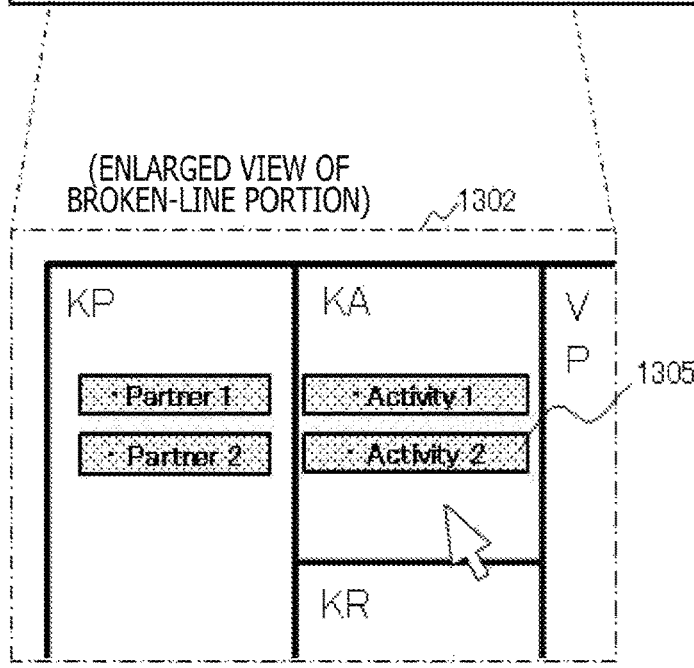

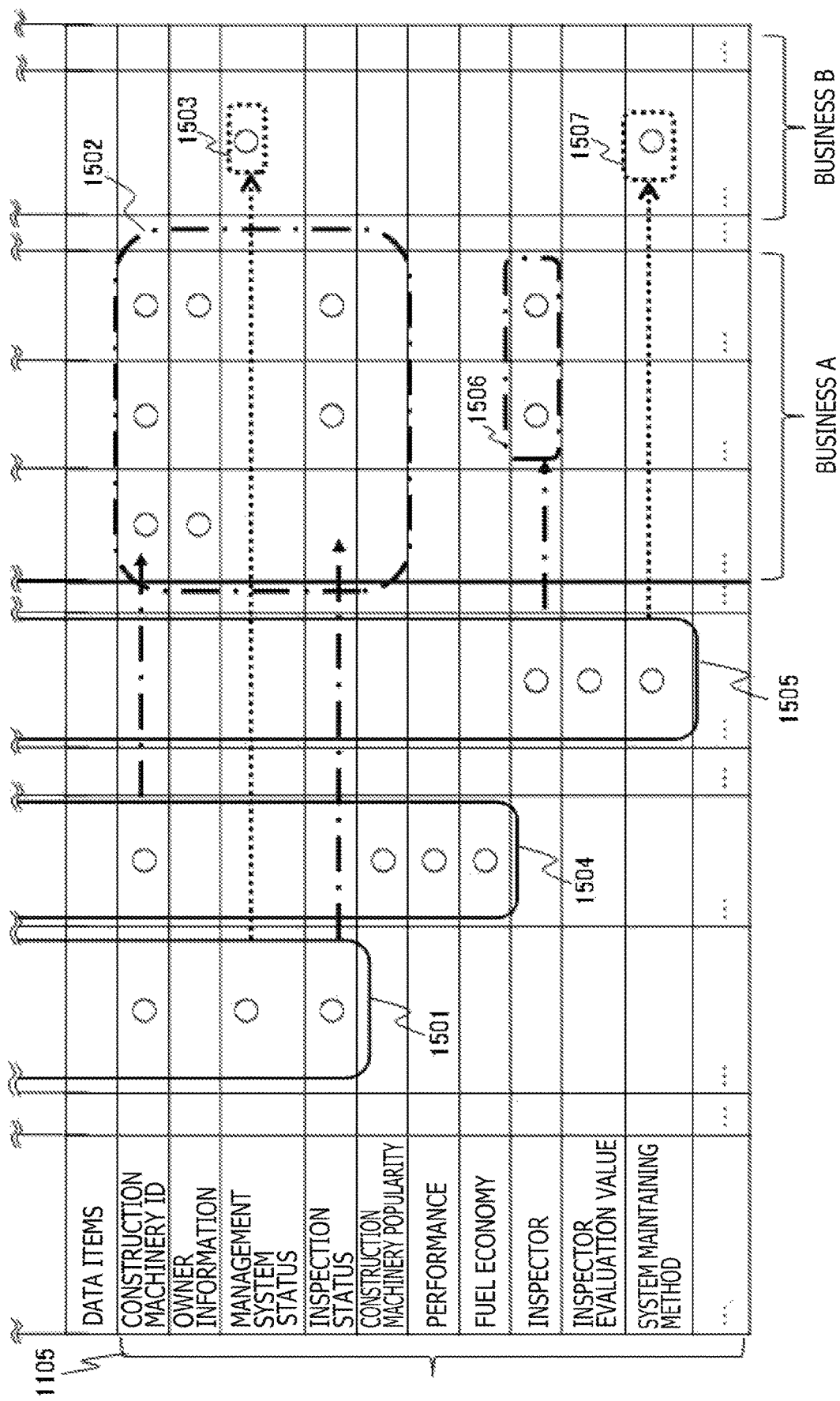

BUSINESS MODEL GENERATION SUPPORT METHOD AND BUSINESS MODEL GENERATION SUPPORT DEVICE

INCORPORATION BY REFERENCE

The present application claims priority from Japanese Patent Application No. 2018-100641 filed on May 25, 2018 (Heisei 30), the content of which is hereby incorporated by reference into this application.

TECHNICAL FIELD

The present invention relates to a device and method for supporting the generation of a new business.

BACKGROUND ART

A technology disclosed, for example, in Patent Document 1 is known as the technology for performing a systematic search for a business model and supporting the design of the business model.

According to Patent Document 1, individual player candidates of an optional business entity and the degree of conformity to business patterns (player types and player requirements) are calculated from the business patterns and a player list (names of player candidates and their business entity characteristic values), and a degree-of-conformity total value is calculated for each business pattern in order to calculate and present the order of conformity of the business patterns.

PRIOR ART DOCUMENT

Patent Document

Patent Document 1: JP-2008-276653-A

SUMMARY OF THE INVENTION

Problem to be Solved by the Invention

According to Patent Document 1, the "degree of conformity" and "similarity" of target businesses are calculated. However, the technology described in Patent Document 1 does not specifically present choices from among various new business candidates.

Consequently, conventional technologies are problematic in that, when, for example, a cross-industry collaboration business is to be generated, although prompt implementation is required, it is impossible to determine whether a proposed business can be promptly implemented. That is to day, when generating a new business by combining existing businesses, the conventional technologies are not able to present the cost (workload) required for commercialization.

The present invention has been made in view of the above circumstances. An object of the present invention is to provide support for generating a new business by bringing different businesses into collaboration.

Means for Solving the Problem

The present invention provides a business model generation support method of causing a computer having a processor and a memory to propose a new business model. The business model generation support method includes a first step, a second step, a third step, a fourth step, and a fifth step.

In the first step, the computer receives a first business model and a second business model. In the second step, for the plurality of business models, the computer adds a first activity and a second activity to first information that is obtained by predefining jobs performed by the business models as activities. The first activity is performed by the first business model. The second activity is performed by the second business model. In the third step, the computer adds a relation between a first data item and the first activity and a relation between a second data item and the second activity to second information that is obtained by predefining a relation between the activities and data items used for performing the activities. The first data item is used for performing the first activity. The second data item is used for performing the second activity. In the fourth step, the computer searches the second information to obtain a third activity that includes both the first data item and the second data item. In the fifth step, the computer outputs the third activity that is performable as a job of a third business model that is obtained by bringing the first business model and the second business model into collaboration.

Advantages of the Invention

The present invention makes it possible to promptly generate a new business. Problems, configurations, and advantages other than those described above will become apparent from the following description of embodiments.

BRIEF DESCRIPTION OF THE DRAWINGS

FIG. 10 is a diagram illustrating an example of an activity/data table according to an embodiment of the present invention.

FIG. 11 is a diagram illustrating an example of a data/cost table according to an embodiment of the present invention.

FIG. 12 is a diagram illustrating an example of a business model canvas input screen according to an embodiment of the present invention.

FIG. 15B is the second half of the conceptual diagram illustrating the process of searching the activity/data table for data linked to an activity of the target business according to an embodiment of the present invention.

MODES FOR CARRYING OUT THE INVENTION

Embodiments of the present invention will now be described based on the accompanying drawings.

Figure 1:
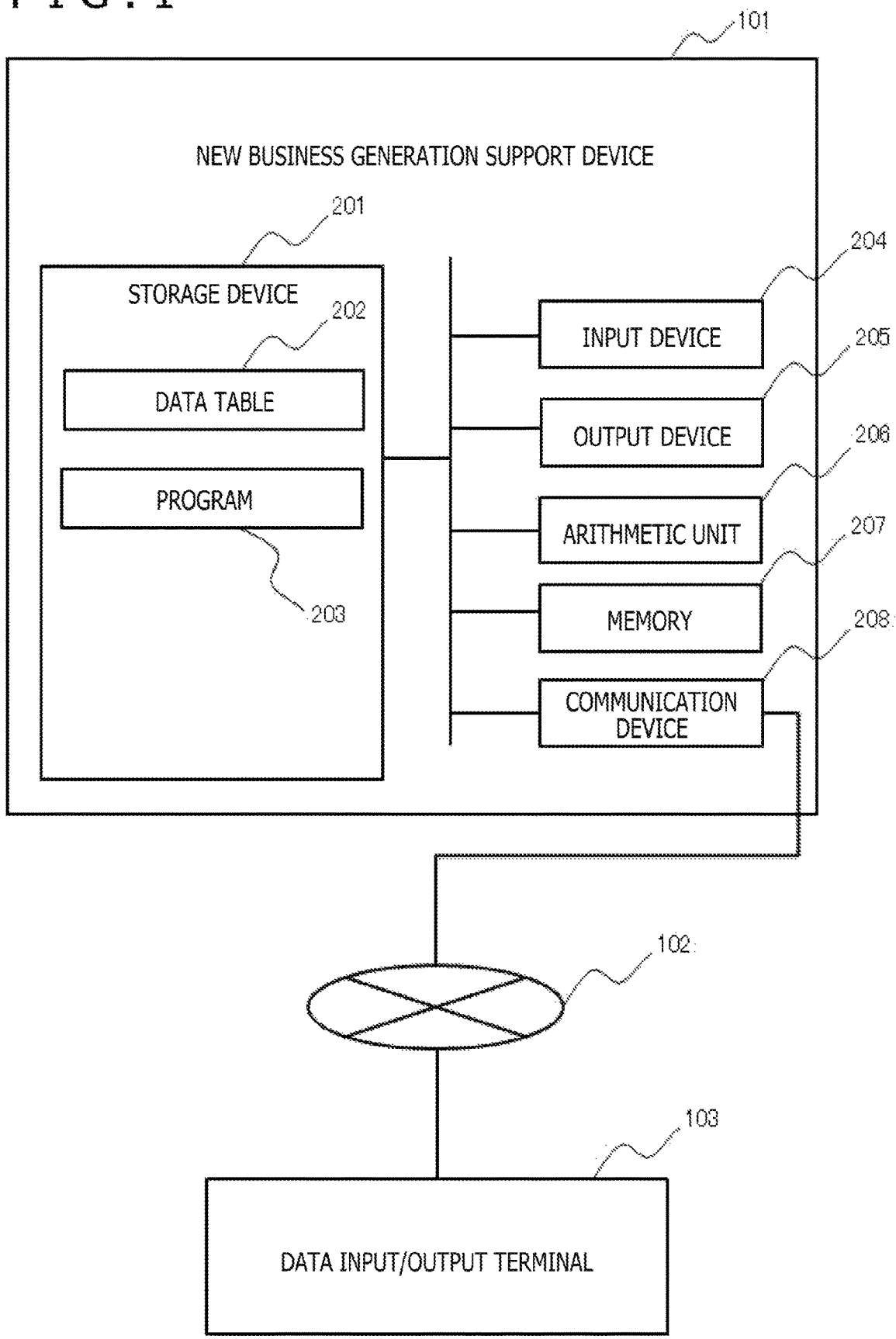
FIG. 1 is a block diagram illustrating an example configuration of a new business generation support system according to an embodiment of the present invention.

FIG. 1 is a block diagram illustrating an example configuration of a new business generation support system and a new business generation support device 101. The new business generation support system according to the present embodiment searches data resources utilized by each of target businesses, uses the elements of a business model canvas, and presents a promptly executable new business.

The new business generation support system is a computer system including the new business generation support device 101, a network 102, and a data input/output terminal 103.

The new business generation support device 101 exchanges information with the data input/output terminal 103 through the network 102. The data input/output terminal 103 receives information inputted from a user through an input device, such as a mouse, a keyboard, or a touch panel, and transmits the inputted information to the new business generation support device 101 through the network 102. Further, the data input/output terminal 103, which is a computer having a communication device and a liquid-crystal display, displays information according to instructions from the new business generation support device 101. It should be noted that the data input/output terminal 103 is utilized by a user of the new business generation support system.

The new business generation support device 101 includes a storage device 201, an input device 204, an output device 205, an arithmetic unit 206, a memory 207, and a communication device 208. The storage device 201 stores data to be used for processing. The input device 204 is, for example, a mouse and a keyboard or a touch panel, and utilized by the user, for example, to input or select data of the business model canvas. The output device 205 is, for example, a liquid-crystal display or a printer and used to output read or processed data, currently processed information, and calculation results. The arithmetic unit 206 processes inputted data and a program read from the storage device 201. The memory 207 temporarily stores currently processed or already processed data. The communication device 208 transmits information to the outside through the network 102 or receives information from the outside through the network 102.

The storage device 201 stores a data table 202 and a program 203. The data table 202 stores user-inputted information as a table. The program 203 processes table information.

The arithmetic unit 206 performs processing by executing the program 203 in the storage device 201 that is loaded into the memory 207. The communication device 208 is connected to the network 102 in order to communicate with the data input/output terminal 103.

A plurality of users and devices may simultaneously input data to and output data from the data table 202 and the program 203.

Figure 2:
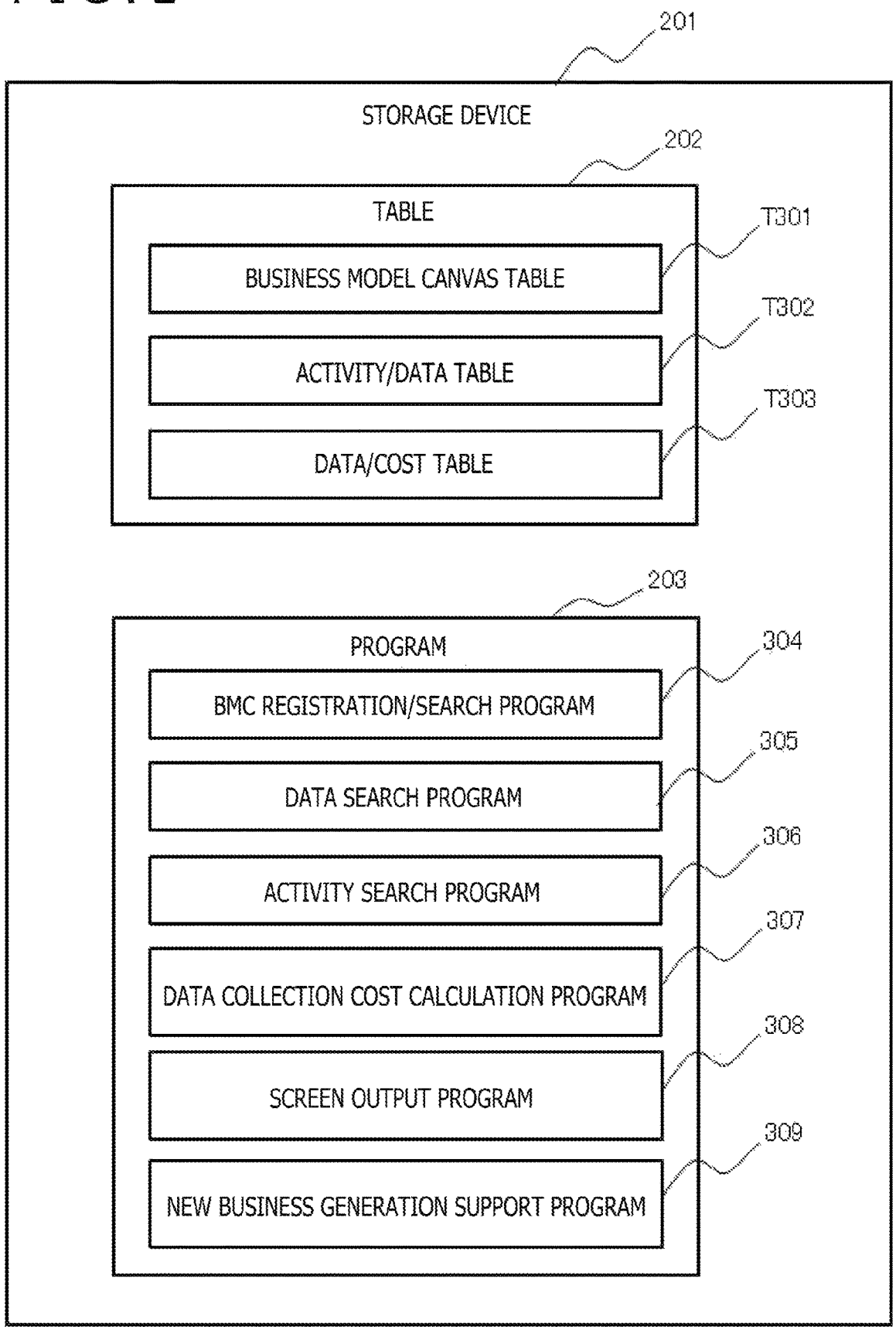
FIG. 2 is a block diagram illustrating a detailed example of a data table and program stored in a storage device according to an embodiment of the present invention.

FIG. 2 illustrates the details of the data table 202 and program 203 stored in the storage device 201.

The data table 202 includes, for example, a business model canvas table T301, an activity/data table T302, and a data/cost table T303.

The business model canvas table T301 will be described in detail with reference to FIG. 9. Meanwhile, the data table T302 will be described in detail with reference to FIG. 10. The data/cost table T303 will be described in detail with reference to FIG. 11.

The program 203 includes, for example, a business model canvas registration/search program 304, a data search program 305, an activity search program 306, a data collection cost calculation program 307, a screen output program 308, and a new business generation support program 309. The new business generation support program 309 transitions execution to the next program at the end of a process.

It should be noted that the business model canvas (BMC in FIG. 2) registration/search program 304 will be described in detail with reference to FIG. 4. The data search program 305 will be described in detail with reference to FIG. 5. The activity search program 306 will be described in detail with reference to FIG. 6. The data collection cost calculation program 307 will be described in detail with reference to FIG. 7. The screen output program 308 will be described in detail with reference to FIG. 8.

The present embodiment will be described with reference to an example in which the new business generation support system proposes a new business A-B in a case where a "construction machinery rental service" of business A and a "real estate smart lock providing service" of business B are brought into collaboration.

Figure 3:
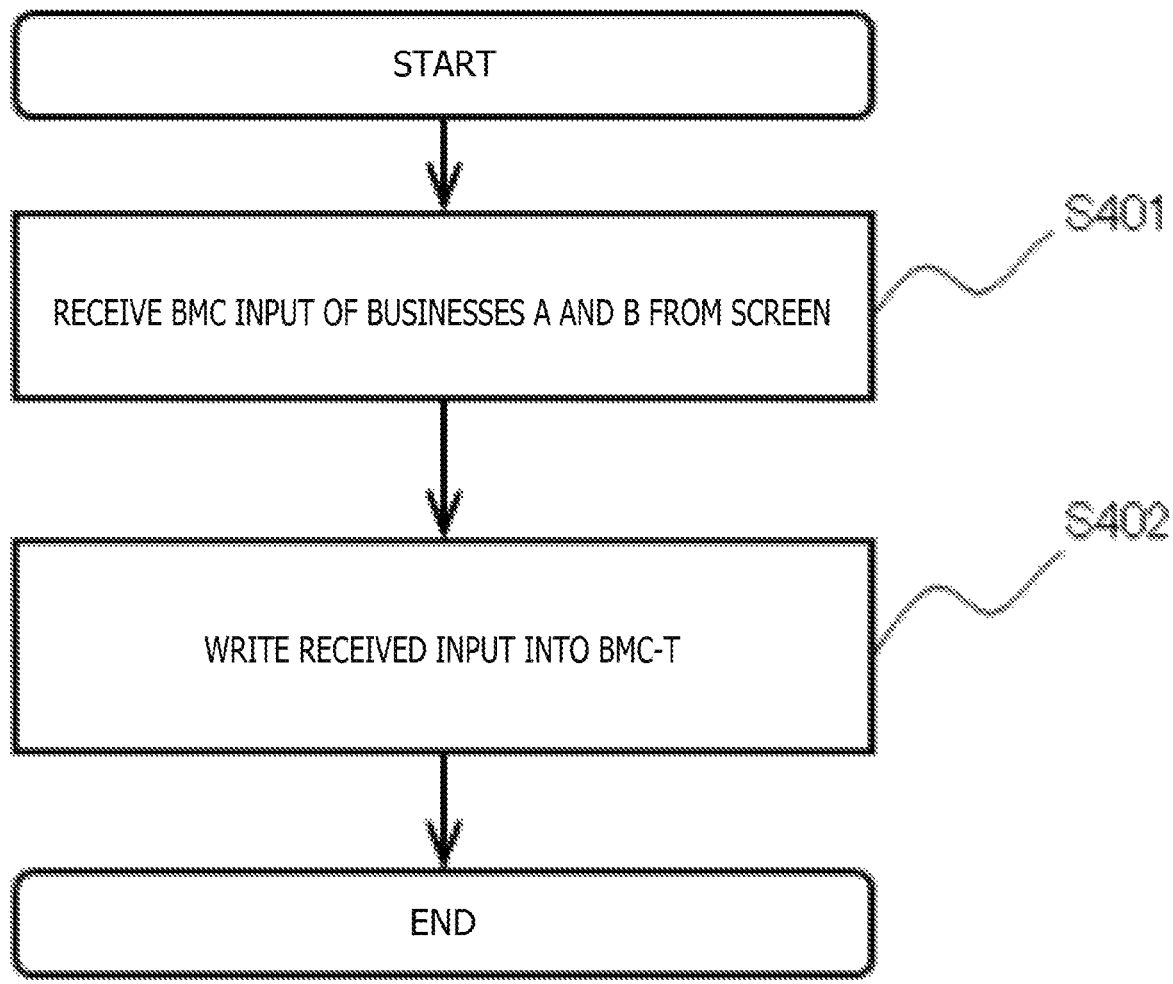
FIG. 3 is a flowchart illustrating an example of a business model canvas registration process of a business model canvas registration/search program according to an embodiment of the present invention.

FIG. 3 is a flowchart illustrating an example of a process that is performed by the new business generation support device 101 according to the present embodiment in order to register a business model canvas in the business model canvas table T301.

The process is executed when the new business generation support device 101 causes the data input/output terminal 103 to display a created input screen and receives an input from a user of the data input/output terminal 103.

The business model canvas registration/search program 304 receives data (elements) on the business model canvas (BMC in FIG. 3) of businesses A and B from the data input/output terminal 103 (step S401).

The business model canvas registration/search program 304 writes the received data into the business model canvas table T301 (step S402). In the present embodiment, new activities, which are the elements of two target businesses A and B, are added, and a business to be generated from target businesses A and B is defined as a "new business A-B."

The "business model canvas" is obtained by arranging individual businesses (business models) according to prescribed items. The present embodiment is described with reference to an example in which the business model canvas includes nine elements, namely, Key Partners (KP), Key Activities (KA), Key Resources (KR), Value Propositions (VP), Customer Relationships (CR), Channels (CH), Customer Segments (CS), Cost Structure (C$), and Revenue Streams (R$).

In The present embodiment, information about the target businesses is arranged with respect to the elements prescribed by the business model canvas, and the arranged information is stored in the business model canvas table T301 to be used for proposing a new business. First of all, the business model canvas will be described.

The business model canvas is known as a framework for gaining an overall understanding of businesses, and has been used for business content arrangement and business idea generation. In the business model canvas, "suppliers" and "customers" exist. The suppliers supply products or services to the customers.

The "Customer Segments (CS)" are specific customers who are regarded as targets by the suppliers. The "Value Propositions (VP)" are the values of products or services provided by the suppliers.

The "Channels (CH)" are the channels for selling products or services. The "Customer Relationships (CR)" indicate the relations between the customers and the products or services. The "Revenue Streams (R$)" include a method adopted by the suppliers to obtain a revenue.

The "Key Resources (KR)" represent management resources used by a business and assets required for business operations. The "Key Activities (KA)" are economic activities mainly conducted by the suppliers.

The "Key Partners (KP)" are business partners for the suppliers. The "Cost Structure (C$)" is a structure in which the suppliers bear the cost. For the business model canvas, an example of a classification divided into the above nine elements will be represented.

Figure 9:
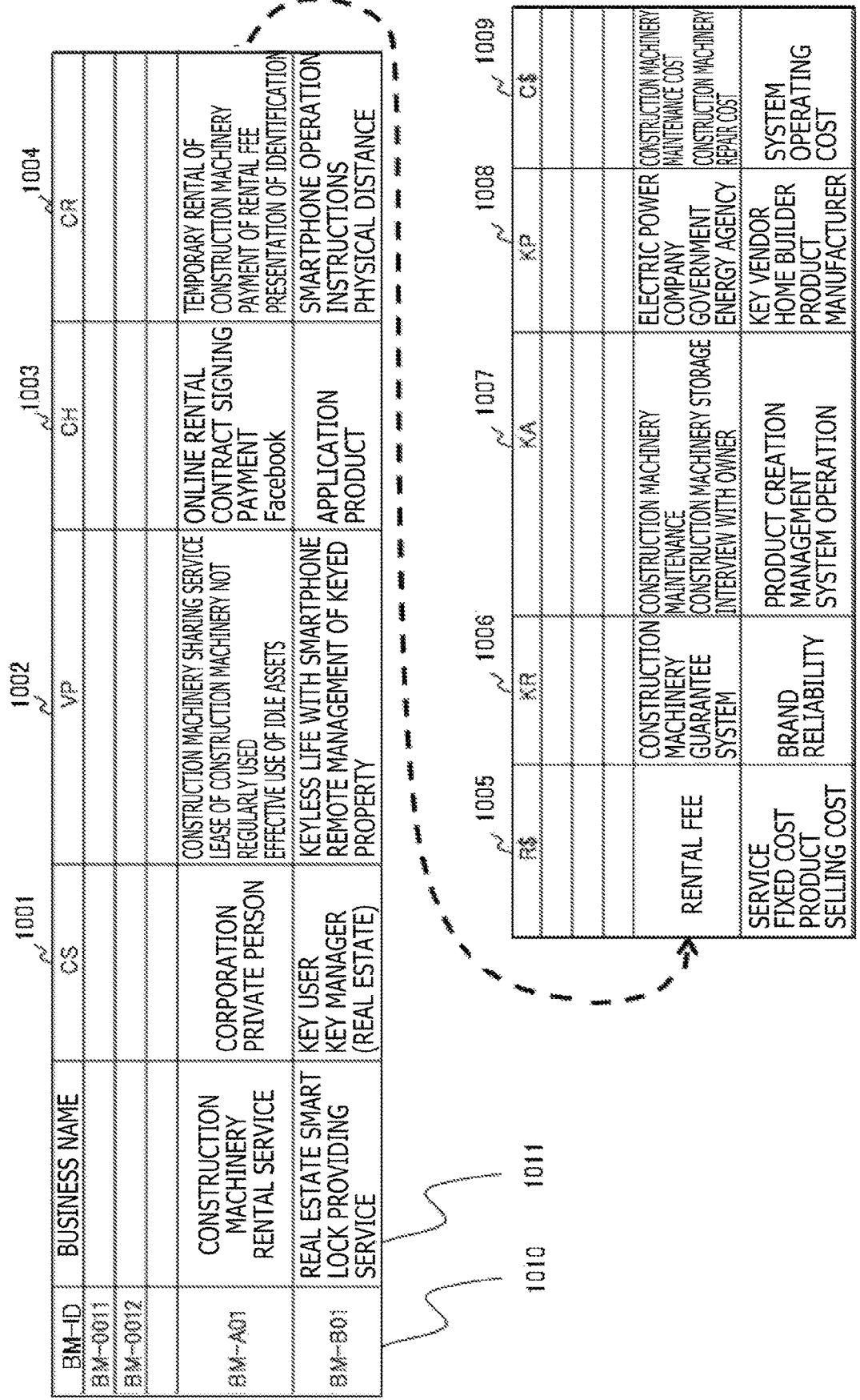
FIG. 9 is a diagram illustrating an example of a business model canvas table according to an embodiment of the present invention.

In the present embodiment, the above nine elements are registered in the business model canvas table T301 with a business model ID 1010 linked to a business name 1011 in the form depicted in FIG. 9.

Further, in the new business generation support system according to the present embodiment, the "Key Activities (KA)" and the "Customer Relationships (CR)" are handled as "activities" (jobs or job descriptions), and the "Key Partners (KP)" and the "Customer Segments (CS)" are handled as "stake holders." The present embodiment uses a business content arrangement method of the business model canvas. However, the arrangement method is not limited to the method. An alternative arrangement method may be used.

Figure 4:
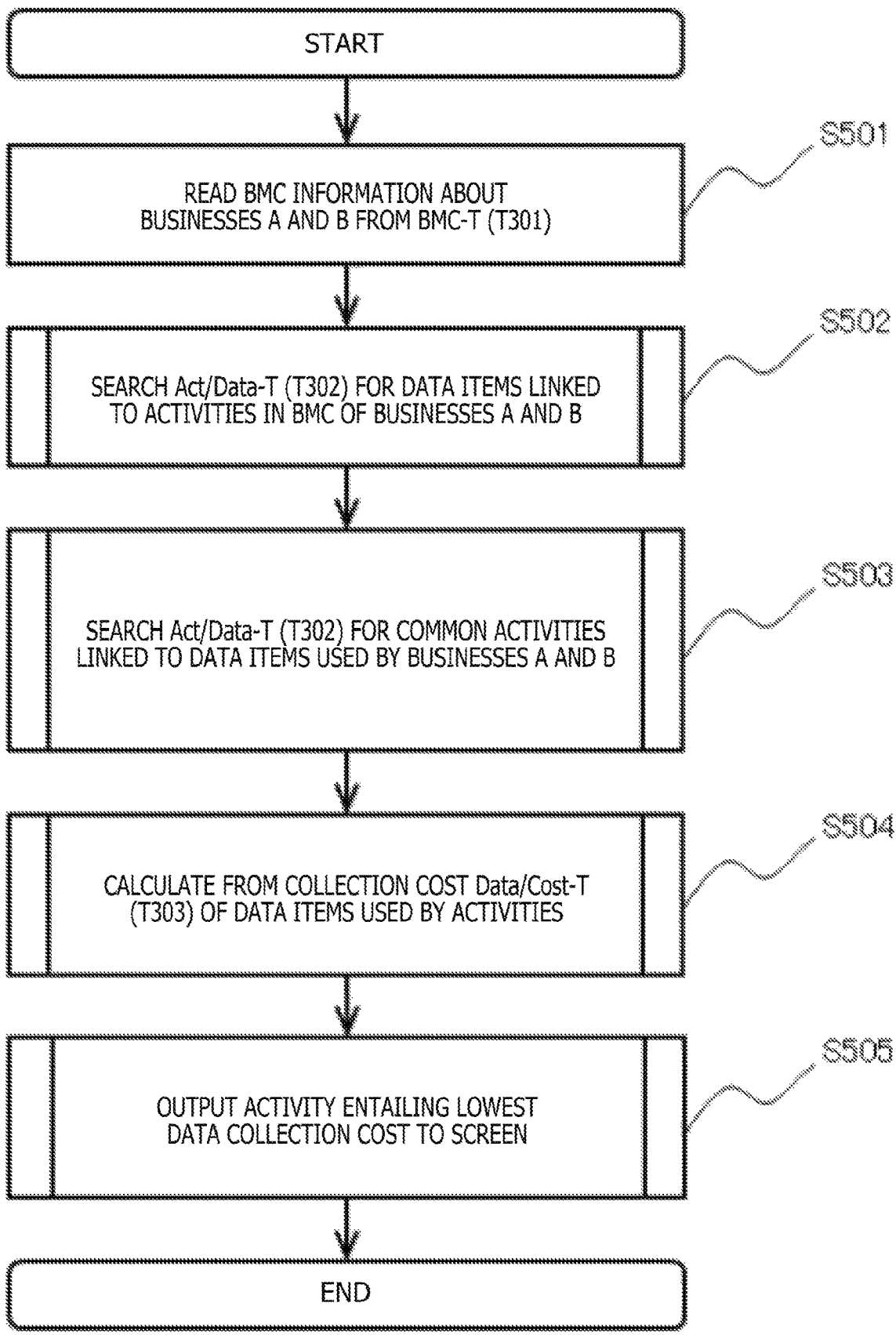
FIG. 4 is a flowchart illustrating an example of a process that is performed by a new business generation support device according to an embodiment of the present invention.

FIG. 4 is a flowchart illustrating an example of a flowchart from the new business generation support program 309 registering business model canvas information in the business model canvas table T301 until an additional activity being displayed on a final output screen.

First of all, the new business generation support program 309 is configured such that information about the business model canvas (BMC in FIG. 4) of businesses A and B, which are used as a source for generating the new business A-B, is selected by the user through the input device 204 from a list displayed on the output device 205 (or the data input/output terminal 103), and the selected business model canvas information is read from the business model canvas table (BMC-T in FIG. 4) T301 (step S501).

Next, the data search program 305 searches the activity/data table (Act/Data-T in FIG. 4) T302 for data items linked to the activities in the business model canvas of businesses A and B (step S502). Step S502 will be described in detail with reference to FIG. 5.

Next, the activity search program 306 searches the activity/data table T302 for common activities linked to the data items used by business A and business B (step S503). Step S503 will be described in detail with reference to FIG. 6.

Next, the data collection cost calculation program 307 acquires the data collection cost of the data items used by the activities from the data/cost table (Data/Cost-T) T303. The data collection cost calculation program 307 then calculates a target data collection cost (step S504). Step S504 will be described in detail with reference to FIG. 7.

Next, the screen output program 308 creates a screen of an activity entailing the lowest data collection cost and a business model canvas related to the activity, and causes the data input/output terminal 103 to output the created screen (step S505). Step S505 will be described in detail with reference to FIG. 8.

Performing the above-described process enables the new business generation support device 101 to present activities capable of promptly implementing a new business from the information about businesses A and B. Further, the new business generation support device 101 is able to present a business model canvas related to the presented activities. This is suggestive of an unprecedented value and a profit derived from an acquired revenue structure. Individual processes are described in detail below.

Figure 5:
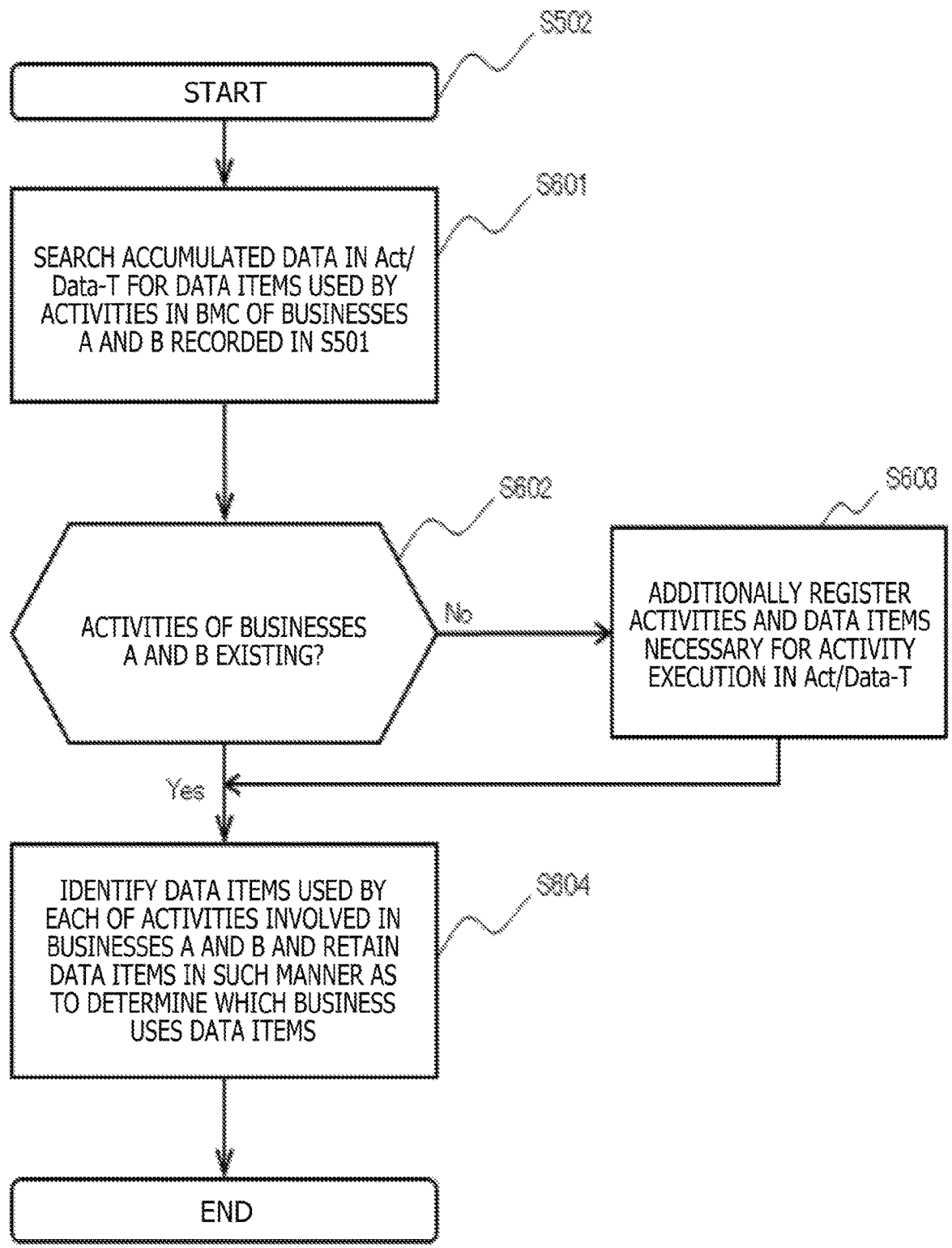
FIG. 5 is a flowchart illustrating an example of a process that is performed by a data search program according to an embodiment of the present invention.

FIG. 5 is a flowchart illustrating an example in which the data search program 305 searches the activity/data table T302 for data linked to activities that are the elements of the business model canvas of a target business. This process is executed in step S502 of FIG. 4.

First of all, the data search program 305 acquires the activities of the business model canvas that is read from the business model canvas table T301 in step S501. In the present embodiment, the data search program 305 acquires the activities of businesses A and B, which are to be considered for generating a new business.

In order to identify the data items to be used by the activities of businesses A and B, the data search program 305 first performs a search on data 1101 in the activity/data table T302 by using the activity IDs 1103 of businesses A and B as a search key (step S601).

In step S602, the data search program 305 calls the activity search program 306, and causes the activity search program 306 to search the activity/data table T302 and determine whether the activity names of businesses A and B exist (step S602).

If it is determined that the result of search does not indicate the existence of relevant activities, the activity search program 306 proceeds to step S603. Meanwhile, if it is determined that the result of search indicates the existence of relevant activities, the activity search program 306 proceeds to step S604.

In step S603, the activity search program 306 adds the activities of the target business and the data items required for executing the activities to the activity/data table T302 (step S603). It should be noted that this process is performed for all activities of businesses A and B. Further, as regards the activities of the target business and the data items, user-specified activities and data 1102 used by the activities (FIG. 10) may be newly registered.

For the sake of explanation, the present embodiment is described with reference to an example in which the data is divided into the data 1101 initially accumulated in the activity/data table T302 and the data 1102 to be newly accumulated. However, in the actual new business generation support system, the data registered in the activity/data table T302 need not always be divided.

In a case where the relevant activities exist in the activity/data table T302 in step S602 or after activities are newly registered in step S603, the activity search program 306 stores the data items used for executing the activities involved in businesses A and B in such a manner as to distinguish between the data items used for business A and the data items for business B (step S604).

Although not depicted, as the entries for data items 1105 in the activity/data table T302, for example, the name or identifier of a business using the data items may be added. This makes it possible to identify the business activities that use the data items 1105.

Subsequently, the data search program 305 terminates the processing depicted in the flowchart of FIG. 5.

The present embodiment is described with reference to an example in which, as for the activities of businesses A and B, which are the target businesses, no relevant search results are obtained from the data 1101 accumulated in the activity/data table T302 and new activities/data 1102 are added by the user.

As regards a combination of activities and data items used for activity execution, it is conceivable that, even when the names of activities are the same, the same activity might be executed by using different data items.

In this case, in order to identify the above-mentioned activities as different activities, the activity search program 306 adds different activity IDs 1103 to the activities and stores them in the activity/data table T302. Thus, the activities can be handled as different activities in subsequent processing as well.

Further, in data item registration, too, it is possible that the same activities and the same data items may be duplicately registered due, for instance, to the use of synonyms or spelling variants. In order to avoid such a situation, the new business generation support system may additionally incorporate a function of determining in advance whether activities and data items used by the activities are duplicately registered or a function of detecting spelling variants at the time of registration and integrating spelling variants having the same meaning. It should be noted that the above functions may be based on well-known or publicly-known technologies such as name-based aggregation.

Figure 6:
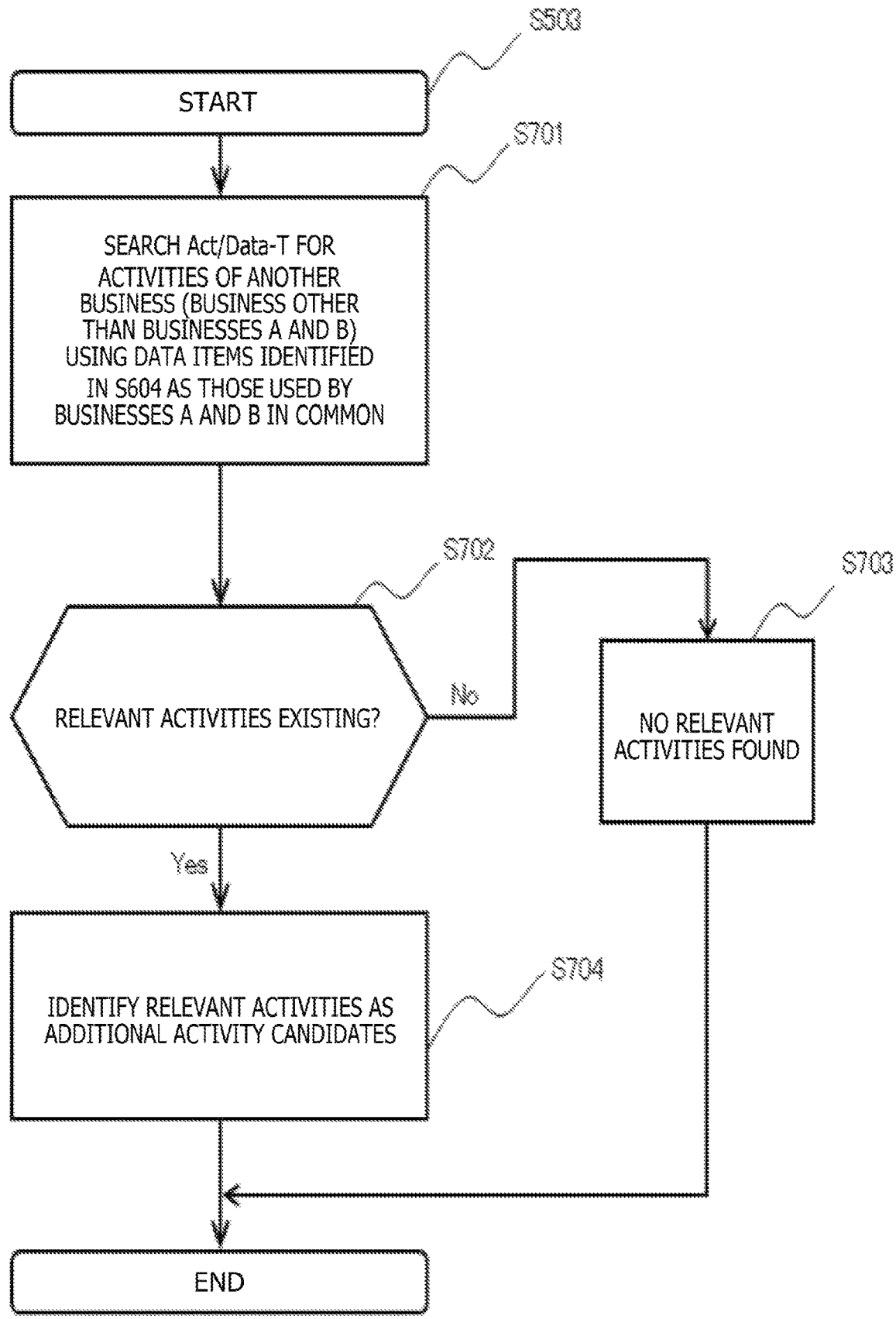
FIG. 6 is a flowchart illustrating an example of a process that is performed by a search program according to an embodiment of the present invention.

FIG. 6 is a flowchart illustrating an example of a process that is performed by the activity search program 306 to search the activity/data table T302 for common activities linked to data items used by the activities of target businesses A and B. This process is executed in step S503 of FIG. 4.

First of all, by using a data item as a key, the activity search program 306 searches the activity/data table T302 for other business activities using data items that are identified in step S604 and that are used by the activities of businesses A and B in common (step S701).

As a result of the above search, different activities using the same data items are identified. Next, the activity search program 306 determines whether the search result indicates the existence of activities using the same data items (step S702).

If the result of determination in step S702 is NO, the activity search program 306 determines that no relevant activities exist, and then terminates the processing depicted in the flowchart of FIG. 6 (step S703).

Meanwhile, if the result of determination in step S702 is YES, the activity search program 306 identifies all relevant activities as "additional activity candidates" (step S704), and then terminates the processing depicted in the flowchart of FIG. 6. It should be noted that the activity search program 306 retains the identified activities in a predetermined area, for example, of the memory 207.

Steps S701 and S702 above will now be described in detail with detailed reference to FIGS. 15A and 15B.

Figure 15A:
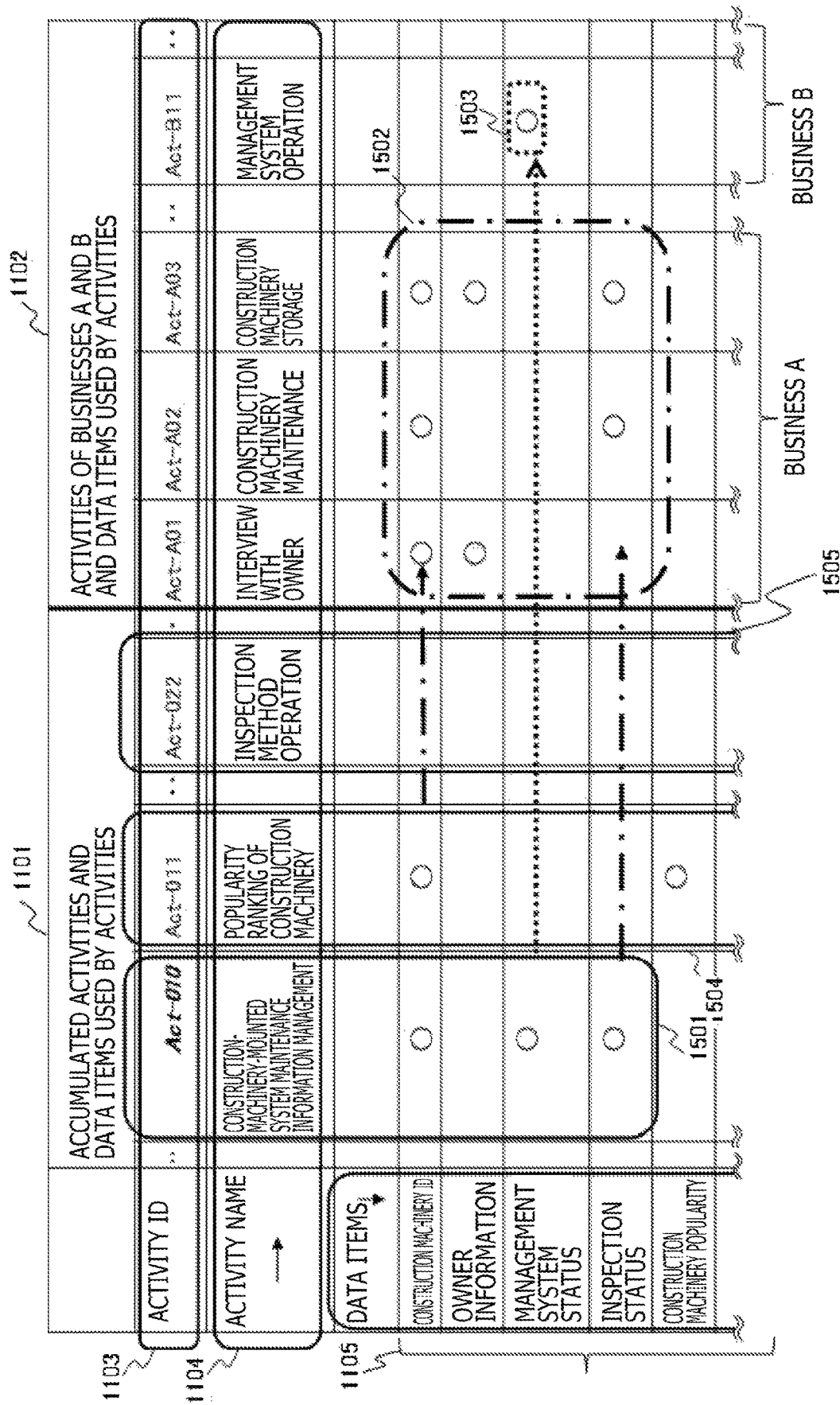
FIG. 15A is the first half of a conceptual diagram illustrating a process of searching the activity/data table for data linked to an activity of a target business according to an embodiment of the present invention.

FIGS. 15A and 15B are conceptual diagrams illustrating, based on FIG. 10, the processing that is performed in step S701 by the activity search program 306 with respect to the activity/data table T302.

In the activity/data table T302, circle marks are placed in individual fields to set the relation between activity IDs 1103, activity names 1104, and data items 1105 used for execution of linked activity names 1104.

For example, the activity ID 1103 of contents in a column 1501 is [Act-010]. Its activity name is "construction-machinery-mounted system maintenance information management." The activity/data table T302 indicates that data items used by this activity are "construction machinery ID," "management system status," and "inspection status." The same applies to the data items in the other columns.

First of all, an example of a method of searching for the "additional activity candidates" will be described.

In the activity/data table T302, for the data items 1105 used under the activity names 1104, a "o" mark (circle mark) is set in a field at the intersection of a column and row. For example, the data items 1105 used under the activity name 1104 of [Act-010] are "construction machinery ID," "management system status," and "inspection status" (column 1501).

The "additional activity candidates" are determined based on whether data items used by the activities of target business A and data items used by the activities of target business B are used by the common activities.

For example, the data used by business A activities [Act-A01], [Act-A02], and [Act-A03] includes "construction machinery ID," "owner information," and "inspection status" (1502 in FIGS. 15A and 15B). Any of these activities are recognized as the data items belonging to business A.

Further, the data items used by business B activity [Act-B11] include "management system status" and "system maintaining method" (1503 and 1507 in FIGS. 15A and 15B). Moreover, [Act-010] ("construction-machinery-mounted system maintenance information management") includes the data items (construction machinery ID, management system status, and inspection status) used by the activities of both businesses A and B, and is therefore selected as an "additional activity candidate."

Certain data used by an existing activity [Act-011] (1504 in FIGS. 15A and 15B) is the same as the data "construction machinery ID," which is used by business A activity [Act-A01]. However, the data items used by the existing activity [Act-011] are not the same as the data items used by business B activity [Act-B11]. Therefore, [Act-011] is not selected as an "additional activity candidate."

Further, as regards the data items used by activity [Act-022] (1505 in FIGS. 15A and 15B), the data item "inspector" is the same as the data item used by business A activity [Act-A02] (1506 in FIGS. 15A and 15B).

Furthermore, the data item "system maintaining method," which is among the data items used by activity [Act-022], is the same as one of the data items used by business B activity [Act-B11]. However, neither of the activities uses an "inspector evaluation value" (1507 in FIGS. 15A and 15B).

As regards activity [Act-022], no data items are used by businesses A and B. However, as the data items of the activities of both businesses A and B are used, activity [Act-022] is selected as an "additional activity candidate."

Depending on whether data items used by the activities of a target business are used by other common activities, a selection is made from a plurality of addition activity candidates. The "additional activity candidates" are selected by using the above method.

Figure 7:
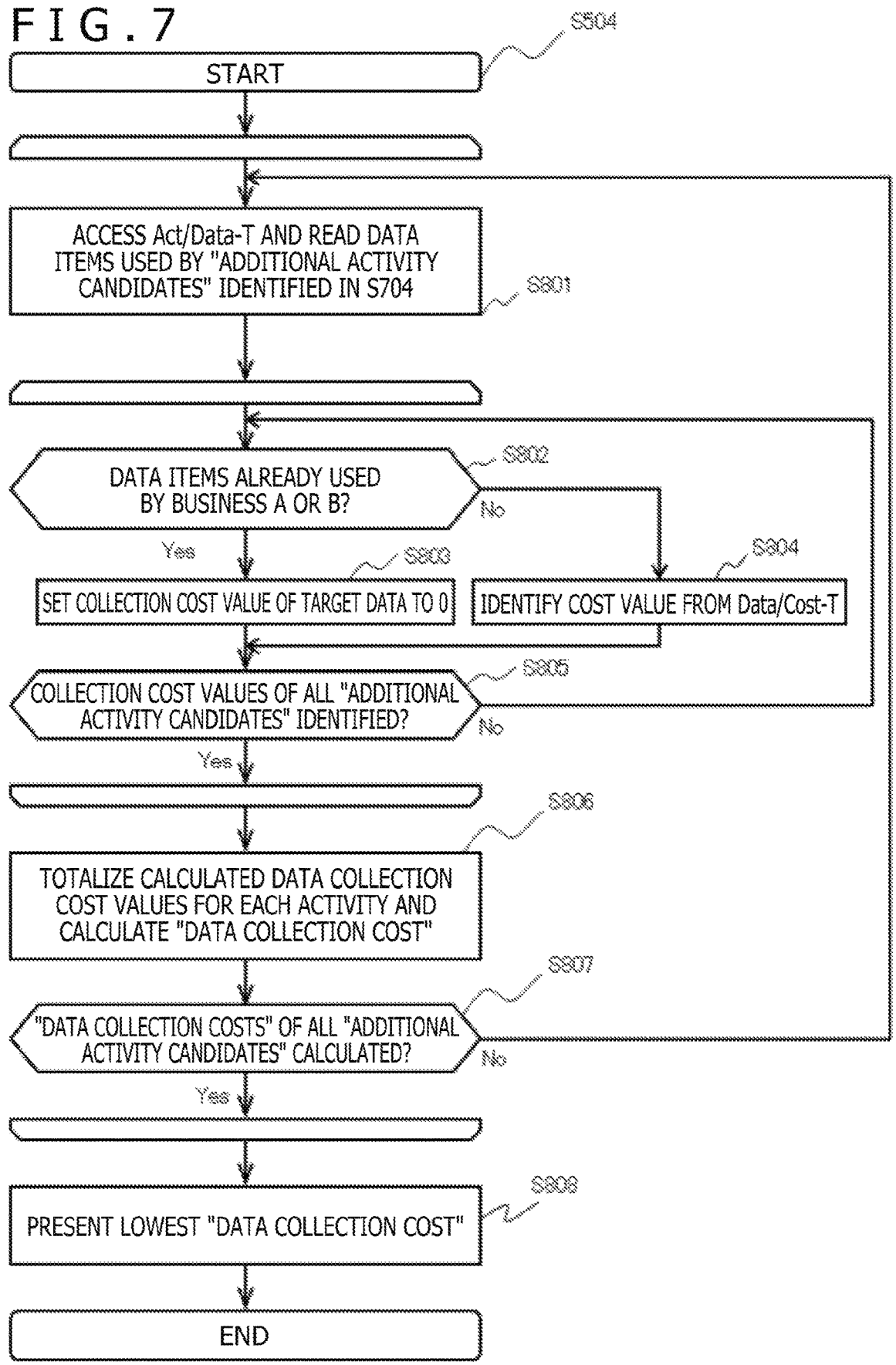
FIG. 7 is a flowchart illustrating an example of a process that is performed by a data collection cost calculation program according to an embodiment of the present invention.

FIG. 7 is a flowchart illustrating an example of a process that is performed by the data collection cost calculation program 307 through acquiring the collection cost required for collecting data on data items used by activities from the data/cost table T303. This process is executed in step S504 of FIG. 4.

First of all, the data collection cost calculation program 307 accesses the activity/data table T302 and reads data items used by the "additional activity candidates" selected in step S704 of FIG. 6 (step S801). For example, the cost value of data having a data ID of 101 and a data item name of construction machinery ID is "5" as indicated in FIG. 11.

The data collection cost calculation program 307 then determines whether the read data items are data items 1105 already used by business A or B (step S802). If the read data items are the already used data items 1105, the data collection cost calculation program 307 determines that the cost value of target data is zero (value: 0) (step S803).

Since relevant data is already used by the jobs of businesses A and B, it is conceivable that no additional cost is required for introducing terminals and processing schemes necessary for acquiring new data.

Referring, for example, to FIGS. 15A and 15B, business A performs various activities using the "owner information" as indicated, for example, in activity [Act-A01]. Specifically, it can be said that a system for acquiring and storing the "owner information" is already built, and that existing information is already accumulated and available for reuse.

However, referring to FIGS. 15A and 15B, the data item "management system status" is not used by business A. For acquiring data on the "management system status," it may be necessary to build a new system for monitoring the "management system status." Further, in a case where no management system is possessed, it is anticipated that various costs will be incurred in order to acquire data on unused data items.

Consequently, as regards data items already collected, the cost value is set to be zero on the presumption that no additional cost is required.

Meanwhile, if the read data items are used by the activities of neither of businesses A and B, the data collection cost calculation program 307 acquires the cost value for acquiring data on the data items from the data/cost table T303 (step S804).

The data collection cost calculation program 307 determines whether all cost values of all data on the data items used by the "additional activity candidates" targeted for search are calculated (step S805), and repeatedly performs above steps S802 to S805 until all the cost values are acquired.

After determining in step S805 that the cost values of all the data items are acquired, the data collection cost calculation program 307 calculates the "data collection cost" by totalizing the cost values acquired for all the targeted "additional activity candidates" (step S806).

The present embodiment uses a totalization method as the method of calculating the "data collection cost." However, the calculation method is not limited to the totalization method and variable from one embodiment to another. Concrete embodiment examples will be described later.

The data collection cost calculation program 307 determines whether all the "data collection costs" of the "additional activity candidates" identified in step S704 of FIG. 6 are calculated (step S807), and repeatedly performs above steps S801 to S806 until all the "data collection costs" are calculated.

After determining in step S807 that all the "data collection costs" are calculated, the data collection cost calculation program 307 selects an "additional activity candidate" entailing the lowest calculated "data collection cost" (step S808), and then terminates the processing depicted in the flowchart of FIG. 7.

When the above processing is performed, the "additional activity candidate" entailing the lowest "data collection cost," which is the total of the cost values, is selected. It should be noted that the above example describes a case where an additional activity candidate entailing the lowest data collection cost is selected. However, the method of additional activity candidate selection is not limited to the above-described one. An alternative, for example, is to arrange and display the additional activity candidates in ascending order of data collection cost.

Figure 8:
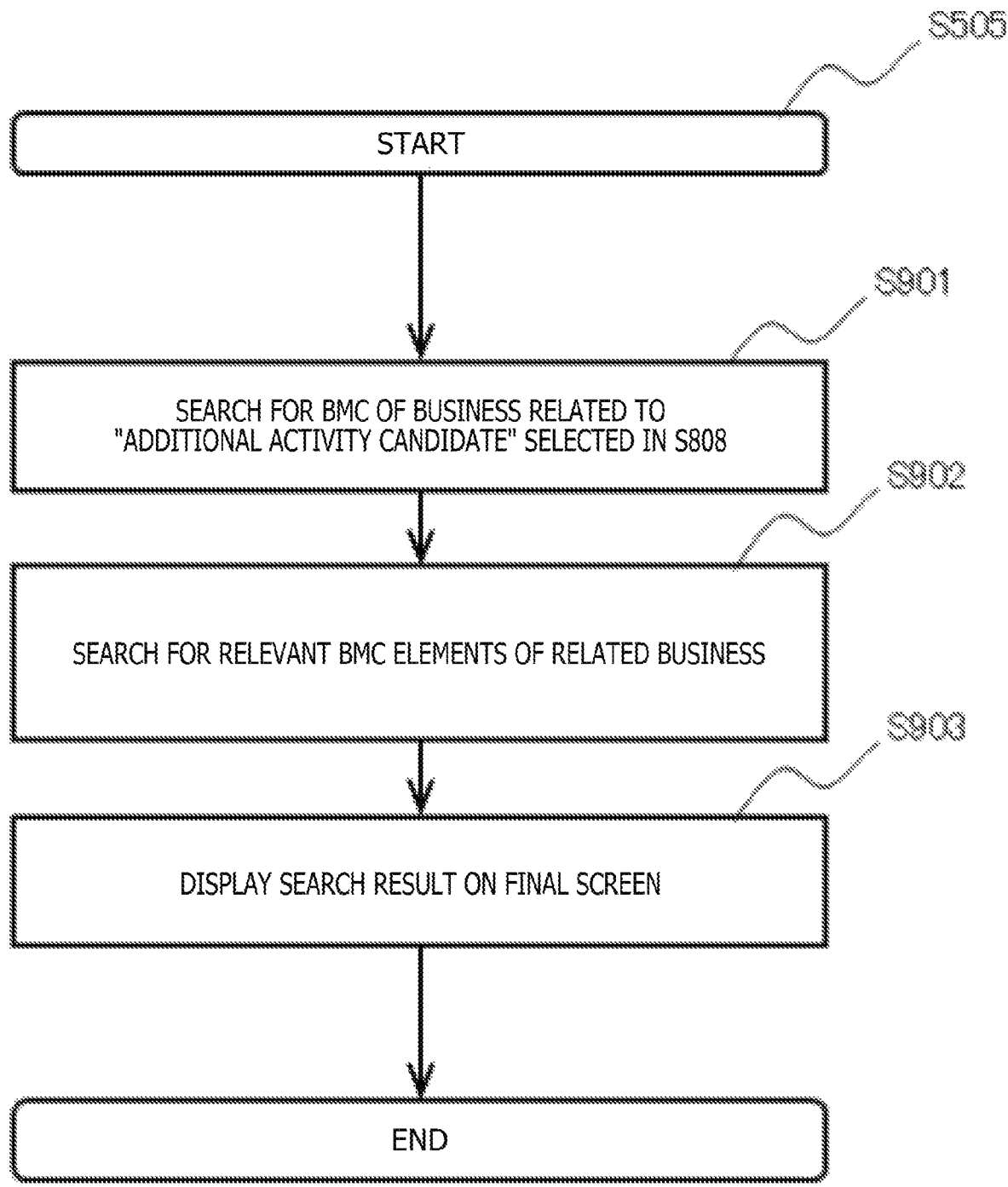
FIG. 8 is a flowchart illustrating an example of a process that is performed by a screen output program according to an embodiment of the present invention.

FIG. 8 is a flowchart illustrating an example of a process that is performed by the screen output program 308 to output an "additional activity candidate" entailing the lowest data collection cost to a final output screen 1401. This process is performed in step S505 of FIG. 4.

First of all, by using an activity name as a key, the screen output program 308 searches the business model canvas table T301 for the business model canvas of businesses (other than businesses A and B) related to the "additional activity candidate" selected in above step S808 of FIG. 7 (step S901).

Next, the screen output program 308 acquires the elements to be presented to the user from among the elements of the business model canvas of businesses, which is the result of search (step S902). The elements of the business model canvas to be presented to the user may include, for example, Revenue Models (R$) and Value Propositions (VP).

Next, the screen output program 308 creates and outputs the final output screen 1401 (FIG. 13) for displaying the above search result (step S903). The final output screen 1401 presents the elements of the business model canvas of businesses other than businesses A and B, and thus makes it possible to determine, for example, values generated by adding activities, target markets, and revenue forms. Therefore, the elements displayed on the final output screen 1401 can be used as indexes for adding activities. In this instance, it is expected that a plurality of businesses are to be displayed instead of a single business.

FIG. 9 is a diagram illustrating an example of a part of the business model canvas table T301. The business model canvas table T301 predefines the elements of a plurality of businesses (business models) arranged by the business model canvas.

The business model canvas table T301 is organized so that a single entry stores a business model (BM in FIG. 9) ID 1010, a business name 1011, CS (Customer Segments) 1001, VP (Value Propositions) 1002, CH (Channels) 1003, CR (Customer Relationships) 1004, R$ (Revenue Streams) 1005, KR (Key Resources) 1006, KA (Key Activities) 1007, KP (Key Partners) 1008, and C$ (Cost Structure) 1009.

As the business model ID 1010, an identifier identifying a business model is stored. As the business name 1011, the name of the business model is stored. As the CS (Customer Segments) 1001, the types and categories of customers targeted for the relevant business model are stored.

As the VP (Value Propositions) 1002, values provided by services and products are stored. As the CH (Channels) 1003, channels for providing business values or conveying values to the customers are stored. As the CR (Customer Relationships) 1004, the ways of handling the customers are stored.

As the R$ (Revenue Streams) 1005, the income sources of the relevant business model are stored. As the KR (Key Resources) 1006, the resources necessary for implementing the relevant business model are stored. As the KA (Key Activities) 1007, the description of business conducted by the relevant business model are stored.

As the KP (Key Partners) 1008, partner companies and organizations necessary for executing the relevant business model are stored. As the C$ (Cost Structure) 1009, the cost incurred by the relevant business model is stored.

The method of adding individual items of the business model canvas will be described later with reference to an input screen depicted in FIG. 12.

Business model canvas data accumulated in the business model canvas table T301 is not completed by data registration performed by a single user. The business model canvas data can be inputted and outputted by a plurality of users and by the data input/output terminal 103. Therefore, information can be shared even if individual persons in charge of business register data at different places and at different times.

FIG. 10 is a diagram illustrating an example of a part of the activity/data table T302. The activity/data table T302 presets the relation between activities (jobs or job descriptions), which are the elements of a business model, and data items used by the activities.

The activity/data table T302 registers therein already accumulated activities, data 1101 used by such activities, activities of businesses A and B newly added in step S603 of FIG. 5 as target businesses, and data 1102 used by such activities.

In the example of FIG. 10, the activity IDs 1103 of newly added activities of business A are "Act-A01," "Act-A02," and "Act-A03." Further, the activity ID 1103 of a newly added activity of business B is "Act-B11."

Items assigned as the CR (Customer Relationships) 1004 and KA (Key Activities) 1007 in the business model canvas depicted in FIG. 9 are accumulated as activities.

For example, the elements of KA (Key Activities) 1007 of business A having a BM-ID 1010 of "BM-A01," namely, "interview with owner," "construction machinery maintenance," and "construction machinery storage," are registered in the activity/data table T302 as the data 1102 having activity IDs 1103 of "Act-A01," "Act-A02," and "Act-A03."

An activity ID 1103 and an activity name 1104 are given to each activity in the activity/data table T302.

Further, linkage is formed to define what data items 1105 are used to execute activities. Referring to FIG. 10, for data used by the activities, a "o" mark (circle mark) is set in a field at the intersection of a column and row. It should be noted that the details of the activity/data table T302 are the same as those of the activity/data table T302 described with reference to FIGS. 15A and 15B.

As regards the relation between the activities and the data items used for activity execution, columns and rows can be added as needed to the activity/data table T302. The user may register the activities and the data in the activity/data table T302 from the data input/output terminal 103.

Further, it is conceivable that the amount of data linked to a single activity may be excessively large and cannot be covered by a user's manual input of data items. If system operations are performed by linking the data to a large-scale new business generation support system, an alternative is to use any method available for automatically registering the activities and the data, for example, by collecting information based on data items acquired and results outputted by the system during job execution.

The method of registering the activities and the data items can be implemented, for example, by automatically reading the results of calculation performed by a program of a system executing a certain activity and data for calculating the results from the configuration of the program.

FIG. 11 is a diagram illustrating an example of a part of the data/cost table T303. The linkage between data items and data collection cost values is accumulated in the data/cost table T303.

As regards the data items 1105 in the activity/data table T302, the data/cost table T303 presets the cost of new data acquisition. The data/cost table T303 is organized so that a single entry includes a data ID 1201, a data item name 1202, a cost value 1203.

As the data ID 1201, an identifier for identifying a data item 1105 is stored. As the data item name 1202, the name of the data item 1105 is stored.

The cost value 1203 is a numerical value indicating the level of difficulty in data collection. Here, the level of difficult in data collection is determined based on the total of a monetary cost required for acquiring specific data, a time cost incurred when a plurality of systems need to be used for data acquisition, and a cost required for securing confidentially or security, for example, of personal information requiring privacy protection. It should be noted that the method of setting the numerical value of cost is not limited to the above-described one.

Further, an alternative is to make an activity selection by mapping, as a second index for activity selection, for example, the similarity to a specific type of business, the degree of novelty of business, or the fitness of business under specific conditions, instead of the cost value 1203.

FIG. 12 is a diagram illustrating an example of a business model canvas input screen 1301. FIG. 12 includes a broken-line portion enlarged view 1302 that depicts an enlarged view of a portion of the business model canvas input screen 1301.

The business model canvas input screen 1301 includes an input section 1303 and a button 1304. The input section 1303 is used to input the business name of a business model canvas. The button 1304 is used to register the inputted business model canvas.

The business model canvas input screen 1301 includes input sections 1305 for inputting information about the nine elements of the business model canvas.

The user of the new business generation support system adds the business model canvas elements of a business from the input sections 1305. The input sections 1305 are to set for the nine elements of the business model canvas.

When the user clicks on the button 1304, based on the location of an input section 1305 used for adding information within the business model canvas input screen 1301, the business model canvas registration/search program 304 determines which element of the business model the added information belongs to, and then registers the added information in the business model canvas table T301.

The business model canvas table T301 registers therein a business name 1011 that is inputted to the input section 1303 by the user. At the time of registration of the business name 1011, the business model canvas registration/search program 304 automatically gives a business model ID 1010 to the relevant business model canvas, and registers the business model ID 1010 in the business model canvas table T301.

The information registered in the business model canvas table T301 is displayed on the data input/output terminal 103 by the business model canvas registration/search program 304 so that the user is allowed to examine the registered information.

At the time of business model canvas confirmation, correction, or deletion, the business model canvas registration/search program 304 is able to read information about individual items from the business model canvas table T301, redisplay the read information on the business model canvas input screen 1301, and process the read information as needed.

Figure 13:
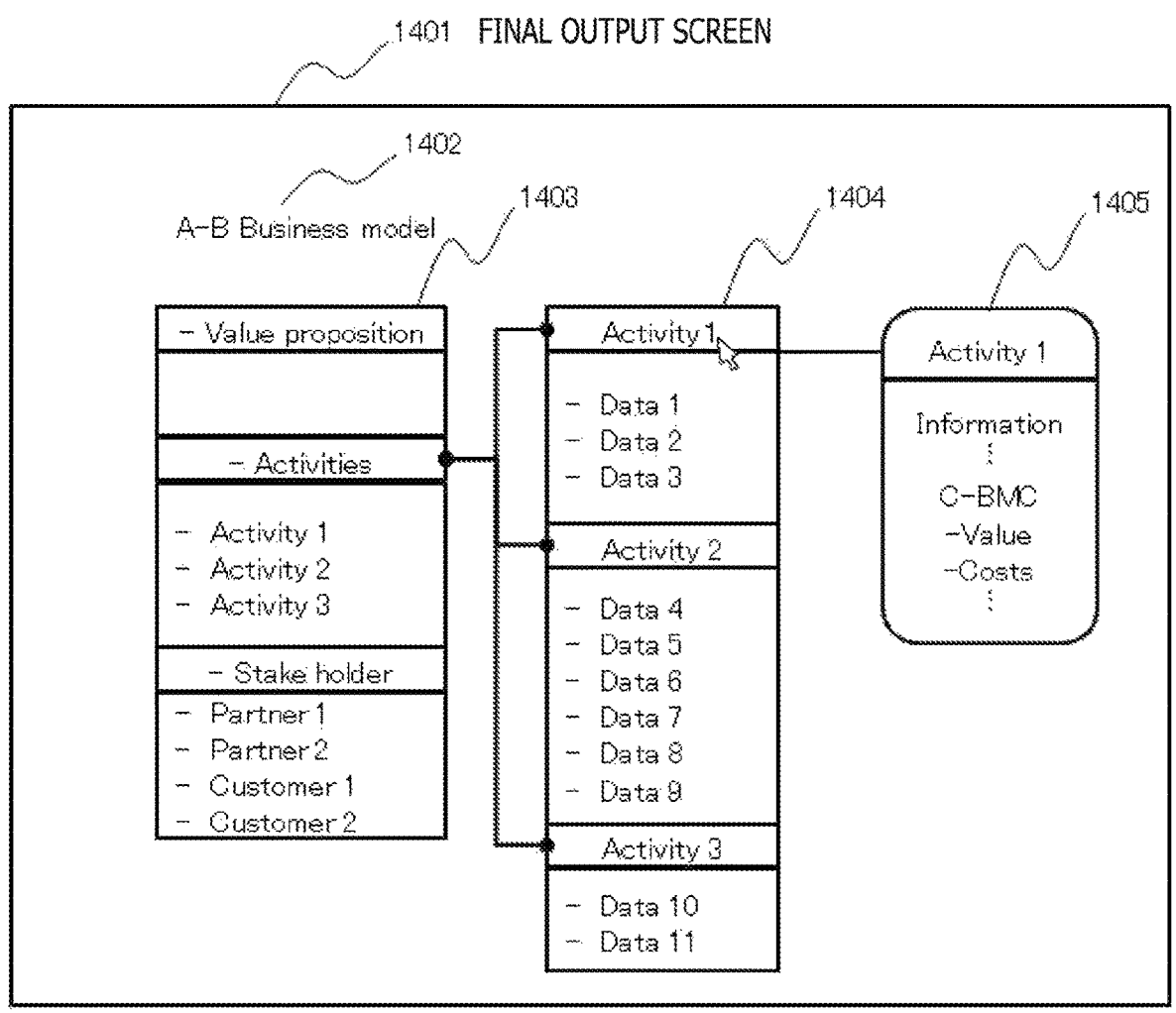
FIG. 13 is a diagram illustrating an example of a final output screen according to an embodiment of the present invention.

FIG. 13 is a diagram illustrating an example of the final output screen 1401.

The final output screen 1401 includes a display section 1402, a lane section 1403, a lane section 1404, and a display section 1405. The display section 1402 displays the new business A-B, which is a combination of businesses A and B. The lane section 1403 displays the elements (activities) of the business model canvas of the new business A-B, which is the combination of businesses A and B acquired from the activity/data table T302. The lane section 1404 displays a result that is obtained when the activity/data table T302 is accessed to acquire the activities displayed in the lane section 1403 and the data items used for executing the displayed activities. The display section 1405 acquires from the business model canvas table T301 information about an existing business model canvas including, for example, a mouse-selected activity displayed in the lane section 1404 and displays the information.

The lane section 1403 includes items named "Value proposition," "Activities," and "Stake holder." As the "Activities," a plurality of additional activity candidates are displayed in ascending order of cost value. In the example depicted in FIG. 13, "Activity 1" incurs the lowest cost.

The business model canvas related to activities selected in the lane section 1404 is row-specific information stored in the business model canvas table T301, and is presented after being composed by items included in each business model canvas that the user wants to reference.

As explained with reference to the processing depicted in FIG. 8, the presentation of the above information provides the confirmation of the information about the business model canvas related to the activities displayed in the lane section 1404. Values generated by the addition of retrieved activities to the activities of the new business A-B and the revenue forms can be confirmed by referencing the business model canvas. Therefore, the user of the new business generation support system is able to verify and determine which activities should be performed by the new business A-B.

The display section 1405 displays the result of retrieval of portions including the same activities as the activities (KA (Key Activities) and CR (Customer Relationships) in business model canvas) in the business model canvas items of target businesses A and B, which are acquired from the business model canvas table T301, from a different business in the business model canvas table T301.

The new business A-B can be presented in the same form as that of the business model canvas input screen 1301. However, in a case where two business model canvases representing the result of post-processing calculation are displayed at once, it is anticipated that the displayed information may be difficult to confirm due to an excessive number of displayed items. Therefore, the final output screen 1401, which is different from the business model canvas input screen 1301, is used.

As described above, when the information about two businesses A and B is inputted to the new business generation support device 101, it is possible to present newly addable activity candidates in a case where a new business is to be generated by bringing the two businesses A and B into collaboration.

The additional activity candidates can be incorporated into the new business A-B as new jobs that do not exist in existing businesses A and B.

Further, by presenting a plurality of additional activity candidates, the new business generation support device 101 is able to propose jobs (additional activity candidates) addable to the new business from among the business model canvas information about existing businesses and the activity/data table T302, and thus provide support for a user in charge of new business generation.

Furthermore, the final output screen 1401 in FIG. 13 depicts an example of displaying the additional activity candidates. However, the final output screen 1401 may alternatively display the data collection cost values of the additional activity candidates. This enables the user of the new business generation support system to determine the cost of implementing necessary jobs at the time of implementing the new business A-B, and provide support for determining whether the new business A-B is promptly implementable.

Moreover, the foregoing embodiment is described with reference to an example in which the new business generation support device 101 causes the display section 1405 to display the information about a business model canvas that uses the additional activity candidates. However, as depicted in FIG. 14, the display section 1405 may alternatively display the information about a business model canvas that includes the additional activity candidates as the elements.

Figure 14:
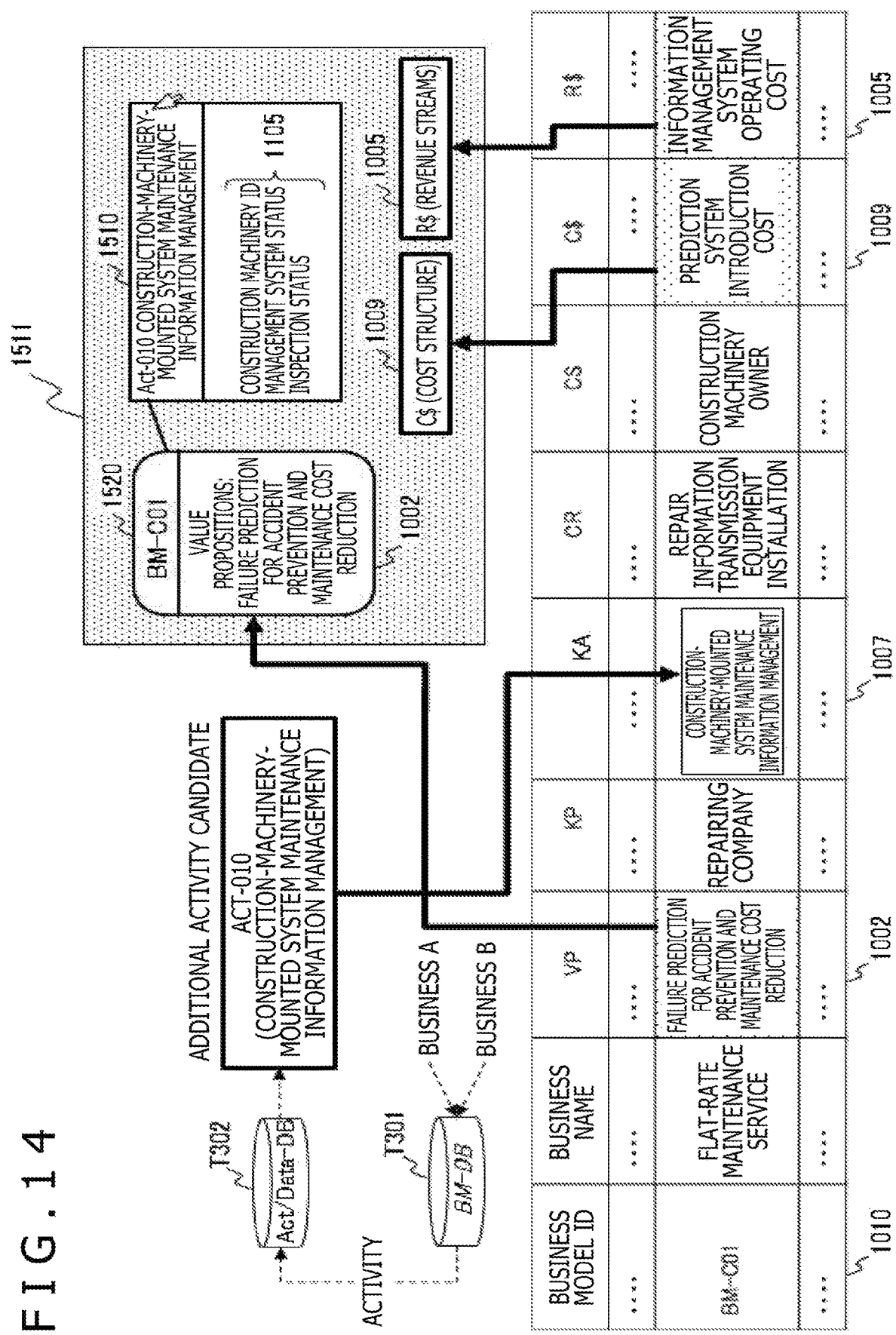
FIG. 14 is a diagram illustrating an example of a business related to an additional activity candidate according to an embodiment of the present invention.

FIG. 14 is a diagram illustrating an example of a business related to the additional activity candidates. When the display section 1405 of the final output screen 1401 is clicked on, the screen output program 308 outputs a display screen 1511 that outputs a business model canvas related to the additional activity candidates.

The contents of the display screen 1511 include additional activity candidates 1510, data items 1105 used by the additional activity candidates, a business model canvas 1520 including the additional activity candidates 1510 as the elements, value propositions (VP1002) of the business model canvas 1520, a cost structure (C$1009), and revenue streams (R$1005).

The new business generation support system makes it easy to know the values provided by a business model including the additional activity candidates, and thus gives a hint to a user who is attempting to generate a new business.

Further, the display screen 1511 displays the cost structure (C$1009) and the revenue streams (R$1005). This makes it easy to make comparisons with the new business A-B depicted in FIG. 14.

As described above, the new business generation support device 101 according to the present embodiment registers businesses A and B in the business model canvas table T301 in order to generate a new business, and extracts the activities of businesses A and B by handling the "Key Activities (KA)" and the "Customer Relationships (CR)" as the activities.

Subsequently, the new business generation support device 101 searches for existing activities having data items 1105 that includes the data items 1105 of business A activities and the data items 1105 of business B activities, and selects the relevant activities as the additional activity candidates.

The new business generation support device 101 calculates the cost value of implementing the selected additional activity candidates in the new business A-B, and calculates the data collection cost of each additional activity candidate from the calculated cost value. The new business generation support device 101 creates the final output screen 1401 by arranging the additional activity candidates in ascending order of data collection cost, and outputs the created final output screen 1401 to the data input/output terminal 103.

The final output screen 1401 enables the user of the new business generation support system to reference, in ascending order of implementation cost, activities that are newly addable when different businesses (businesses A and B) are brought into collaboration. This makes it possible to provide support for generating a new business.

Specifically, the present embodiment is capable of presenting a promptly buildable business model by making use of existing data resources (business model canvas table T301 and activity/data table T302).

CONCLUSIONS

As described above, the new business generation support device 101 according to the present embodiment includes the business model canvas table T301 and the activity/data table T302. The business model canvas table T301 defines the activities (elements) of a business model. The activity/data table T302 presets the relation between data items used for executing the activities of the business model.

The new business generation support device 101 receives the activities of business model A (business A) and the activities of business model B (business B), which are to be examined, searches the activity/data table T302 for data items to be used for executing the activities of business model A and data items to be used for executing the activities of business model B, selects activities of another business model that use in common the data items used for the activities of business models A and B, and presents the selected activities as additional activity candidates implementable in the new business A-B.

When the above processing is performed to add the information about existing businesses A and B, which are to be brought into collaboration, to the business model canvas table T301 and the activity/data table T302, the new business generation support device 101 is able to automatically propose the activities of the other business that can be used in the new business A-B, which is the result of collaboration between businesses A and B.

The new business generation support device 101 calculates the total of acquisition costs of individual additional activity candidates as the data collection cost from the data/cost table T303, which presets the data acquisition cost of each data item, and selects an additional activity candidate entailing the lowest data collection cost.

When the above processing is performed, the new business generation support device 101 is able to present activities usable as the activities of an existing business model at the time of bringing different businesses into collaboration for new business generation, and thus provide support for generating a new business.

Further, as regards candidates for activities addable to the new business A-B, the new business generation support device 101 searches the business model canvas table T301 for a business model using the activities, and presents the information (e.g., value propositions) about the business model.

A hint can be given to the user attempting to generate a new business by presenting the value propositions to be provided by another business model including additional activity candidates as the elements.

While the present invention has been described in terms of an embodiment, it should be understood that the foregoing description of the present invention is illustrative and not restrictive. The scope of the present invention is not limited to the above-described configuration. The present invention can be implemented in various other embodiments.

For example, the foregoing embodiment is described in detail in order to facilitate the understanding of the present invention. The present invention is not necessarily limited to a configuration that includes all the above-described component elements. Further, some component elements of an embodiment may be partly replaced by the component elements of another embodiment, and the component elements of an embodiment may be added to the component elements of another embodiment. Furthermore, some component elements of each embodiment may be subjected to the addition of other component elements of a different configuration, deleted, or replaced by other component elements either on an individual basis or in combination.

Moreover, the foregoing embodiment has been described on the assumption that a business model canvas is used as a business content analysis method. However, the present invention is not limited to the use of such a method. Different notation methods and analysis methods may alternatively be used.

Further, as two businesses, namely, businesses A and B, construction machinery and smart lock businesses have been described in conjunction with the foregoing embodiment. However, the present invention is not limited to such two businesses. The present invention may alternatively be applied to other businesses.

Furthermore, the foregoing embodiment has been described on the assumption that two businesses, namely, businesses A and B, are regarded as targets. However, the number of target businesses is not limited to two, but may be one or three or more.

Moreover, the foregoing embodiment has been described on the assumption that the data collection cost is used for evaluating the promptness of business implementation. However, the present invention is not limited to the use of such an evaluation index. A different evaluation index may alternatively be used.

Further, although the promptness of business implementation is evaluated in the foregoing embodiment, the degree of conformity to new technologies for providing new values may alternatively be used as the evaluation index. For example, in a case where a plurality of business persons possess the same data and the addition of new activities making use of such data is proposed, ledgers may be shared by a plurality of organizations in order to evaluate, for example, the possible applicability of blockchain technology providing features, such as tamper resistance and transparency.

Furthermore, for example, the above-described component elements, functions, processing sections, and processing means may be partly or wholly implemented by hardware, that is, for example, by appropriately designing integrated circuits. Further, for example, the above-described component elements and functions may be implemented by software, that is, by allowing the arithmetic unit to interpret and execute programs for implementing the individual functions. Information regarding, for example, the programs, tables, and files for implementing the individual functions may be stored in a recording device, such as a memory, a hard disk, or an SSD (Solid State Drive), or in a recording medium, such as an IC card, an SD card, or a DVD.

Control lines and information lines considered necessary for explanation are depicted, and all the control lines and information lines necessary for products are not depicted. It may be considered that almost all component elements are actually interconnected.

The invention claimed is:

1. A business model generation support method of causing a computer having a processor and a memory to propose a new business model, the business model generation support method comprising:
    a first step of causing the computer to receive a first business model and a second business model;
    a second step of causing the computer to add, for the plurality of business models, a first activity performed by the first business model and a second activity performed by the second business model to first information predefining jobs performed by the business models as activities;
    wherein the second step includes a step of causing the computer to add a first activity identifier to the first activity and a second activity identifier to the second activity, and to store the first and second activities and the respective, corresponding first and second activity identifiers in an activity data table;
    a third step of causing the computer to add a relation between a first data item used for performing the first activity and the first activity and a relation between a second data item used for performing the second activity and the second activity to second information predefining a relation between the activities and data items used for performing the activities;
    wherein the third step includes causing the computer to add the relation by setting a symbol in a first field in the activity data table at an intersection of a column corresponding to the first activity identifier and a row corresponding to the first data item used to perform the first activity, and setting a symbol in a second field at an intersection of a column corresponding to the second activity identifier and a row corresponding to the second data item used to perform the second activity;
    a fourth step of causing the computer to search the second information to obtain a third activity including both the first data item and the second data item based at least in part on the symbols in the activity data table;
    wherein the fourth step includes a step of causing the computer to search the activity data table using one of the first and second data items as a search key to identify other business model activities using the first and second data items; and
    a fifth step of causing the computer to output the third activity that is performable as a job of a third business model obtained by bringing the first business model and the second business model into collaboration, wherein the fifth step includes:
    acquiring a plurality of the third activities;
    referencing third information that presets a data acquisition cost of each data item;
    calculating a total of acquisition costs of data items used by the third activities as a data acquisition cost of the third activities; and
    in the third information, the monetary or time value required to acquire the data is pre-set as the cost, and the cost is set to zero if the data item is already in use.

2. The business model generation support method according to claim 1, wherein
    the fifth step includes
    acquiring a plurality of the third activities,
    referencing third information that presets a data acquisition cost of each data item, and
    calculating a total of acquisition costs of data items used by the third activities as a data acquisition cost of the third activities.

3. The business model generation support method according to claim 2, wherein
    the fifth step includes
    selecting a third activity entailing a lowest data acquisition cost from among the plurality of the third activities.

4. The business model generation support method according to claim 2, wherein
    the fifth step includes
    outputting the plurality of the third activities in ascending order of the data acquisition cost.

5. The business model generation support method according to claim 1, further comprising:
    a sixth step of causing the computer to obtain the third business model including the third activities by searching the first information, and output the obtained third business model as information related to the third activities.

6. A business model generation support device having a processor and a memory and proposing a new business model, the business model generation support device comprising:
    an activity data table;
    first information that predefines jobs performed by a plurality of business models as activities; and
    second information that predefines a relation between the activities and data items used for performing the activities, wherein
    the processor receives a first business model and a second business model; and adds a first activity performed by the first business model and a second activity performed by the second business model to the first information by adding a first activity identifier to the first activity and a second activity identifier to the second activity, and storing the first and second activities and the corresponding first and second activity identifiers in the activity data table;
    the processor adds a relation between a first data item used for performing the first activity and the first activity and a relation between a second data item used for performing the second activity and the second activity to the second information by setting a symbol in a first field in the activity data table at an intersection of a column corresponding to the first activity identifier and a row corresponding to the first data item used to perform the first activity, and setting a symbol in a second field at an intersection of a column corresponding to the second activity identifier and a row corresponding to the second data item used to perform the second activity; and
    the processor searches the second information to obtain a third activity including both the first data item and the second data item using one of the first and second data items as a search key to identify other business model activities using the first and second data items; and outputs the third activity that is performable as a job of a third business model obtained by bringing the first business model and the second business model into collaboration.

7. The business model generation support device according to claim 6, further comprising:

third information that presets a data acquisition cost of each of the data items, wherein the processor acquires a plurality of the third activities, references the third information, and calculates a total of acquisition costs of data items used by the third activities as a data acquisition cost of the third activities.

8. The business model generation support device according to claim 7, wherein the processor selects a third activity entailing a lowest data acquisition cost from among the plurality of the third activities.

9. The business model generation support device according to claim 7, wherein the processor outputs the plurality of the third activities in ascending order of the data acquisition cost.

10. The business model generation support device according to claim 6, wherein the processor searches the first information to obtain a third business model including the third activities, and outputs the obtained third business model as information related to the third activities.

* * * * *